(12) United States Patent
Niizuma

(10) Patent No.: US 9,662,993 B2
(45) Date of Patent: May 30, 2017

(54) PARKING FACILITY

(71) Applicant: IHI Corporation, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 354 days.

(21) Appl. No.: 14/594,628

(22) Filed: Jan. 12, 2015

(65) Prior Publication Data

US 2015/0123609 A1     May 7, 2015

Related U.S. Application Data

(63) Continuation of application No. PCT/JP2013/066600, filed on Jun. 17, 2013.

(30) Foreign Application Priority Data

Aug. 16, 2012   (JP) .................................. 2012-180551

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1825* (2013.01); *B60L 11/1829* (2013.01); *E04H 6/22* (2013.01); *E04H 6/34* (2013.01); *E04H 6/42* (2013.01); *H02J 17/00* (2013.01); *B60L 2230/16* (2013.01); *B60L 2270/147* (2013.01); *Y02T 10/7005* (2013.01); *Y02T 10/7088* (2013.01); *Y02T 90/121* (2013.01);
(Continued)

(58) Field of Classification Search
CPC .. B60L 11/182; B60L 11/1827; B60L 11/1829

USPC .................................. 320/108, 109; 307/104
See application file for complete search history.

(56) References Cited

U.S. PATENT DOCUMENTS

2013/0015699 A1*   1/2013   Mita ....................... H02J 5/005
                                                    307/9.1

FOREIGN PATENT DOCUMENTS

CN           101057765 A      10/2007
DE        102009047504 A1      6/2011
(Continued)

OTHER PUBLICATIONS

International Search Report, PCT/JP2013/066800, 1 pg. (English Translation), 1 pg. (Japanese Language).

*Primary Examiner* — Drew A Dunn
*Assistant Examiner* — Zixuan Zhou
(74) *Attorney, Agent, or Firm* — Volpe and Koenig, P.C.

(57) ABSTRACT

A parking facility horizontally moving a pallet on which a vehicle is mounted, to store the vehicle in a storage space, includes: the pallet having magnetic field transmissibility in a portion corresponding with a power-receiving coil provided on a bottom surface of the vehicle; a power-supplying coil that is provided in the storage space so as to be opposed to the portion and that supplies power wirelessly to the power-receiving coil; and a foreign matter removal section that is provided on a lower surface of the pallet and that, with a movement of the pallet, engages, by contacting an upper surface of the power-supplying coil or by being spaced a given distance from the upper surface of the power-supplying coil, foreign matter, to remove the foreign matter present on the upper surface of the power-supplying coil.

10 Claims, 7 Drawing Sheets

(51) Int. Cl.
*H02J 17/00* (2006.01)
*E04H 6/22* (2006.01)
*E04H 6/34* (2006.01)
*E04H 6/42* (2006.01)

(52) U.S. Cl.
CPC ............ *Y02T 90/122* (2013.01); *Y02T 90/125* (2013.01); *Y02T 90/128* (2013.01); *Y02T 90/14* (2013.01); *Y02T 90/163* (2013.01)

(56) References Cited

FOREIGN PATENT DOCUMENTS

| | | |
|---|---|---|
| DE | 102010020122 A1 | 11/2011 |
| JP | 2002-235451 A | 8/2002 |
| JP | 2006-345588 A | 12/2006 |
| JP | 2010-022183 A | 1/2010 |
| JP | 2010-226946 A | 10/2010 |
| JP | 2011-072115 A | 4/2011 |
| JP | 2011-080260 A | 4/2011 |
| JP | 2011-097814 A | 5/2011 |
| JP | 2011-120345 A | 6/2011 |
| JP | 2012-019906 A | 2/2012 |
| JP | 2012-207448 A | 10/2012 |
| JP | 2013-115915 A | 6/2013 |
| JP | 2014-027772 A | 2/2014 |
| JP | 2014-073040 A | 4/2014 |
| JP | WO 2014200024 A1 * 12/2014 .............. B60L 1/003 |

* cited by examiner

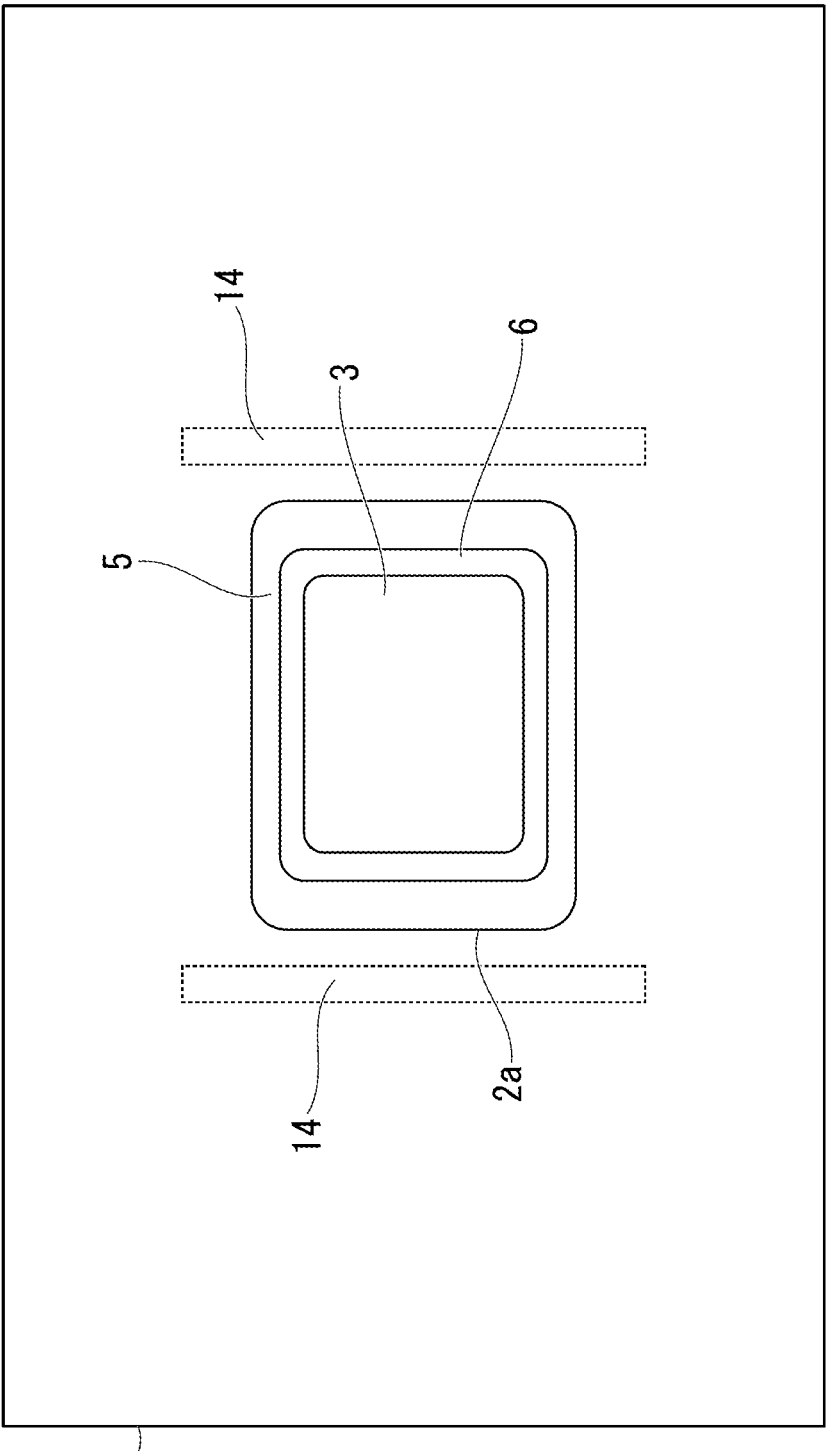

PARKING FACILITY

This application is a continuation application based on a PCT Patent Application No. PCT/JP2013/066600, filed Jun. 17, 2013, whose priority is claimed on Japanese Patent Application No. 2012-180551, filed Aug. 16, 2012. The contents of both the PCT application and the Japanese Patent Application are incorporated herein by reference.

TECHNICAL FIELD

The present invention relates to a parking facility.

BACKGROUND ART

Patent Document 1 below discloses a wireless power-supplying system that is capable of supplying power safely and efficiently without foreign matter intruding into a space between a power-receiving unit provided on a bottom surface of a vehicle and a power-supplying unit buried in a parking space. In the above-mentioned wireless power-supplying system, an insulating separation material is provided in the space between the power-receiving unit of the vehicle and the power-supplying unit of the parking space. During the time except when power is being supplied, the separation material is stored in the ground by a movable unit. On the other hand, when power is being supplied, the separation material is moved to the space between the power-receiving unit and the power-supplying unit by the movable unit.

DOCUMENT OF RELATED ART

Patent Document

Patent Document 1: Japanese Unexamined Patent Application, First Publication No. 2010-226946

SUMMARY OF INVENTION

Technical Problem

In the above-mentioned conventional technique, the separation material is arranged between the power-receiving unit and the power-supplying unit to prevent foreign matter from intruding into the space between the power-receiving unit and the power-supplying unit. However, there is a problem that it is not possible to remove foreign matter if the foreign matter is already present on a power-supplying coil. Furthermore, in the above-mentioned conventional technique, it is necessary to provide a movable unit that requires a complex mechanical system, resulting in a problem of increased manufacturing costs.

The present invention is conceived in view of the above-described circumstances, and the object of the present invention is to provide a parking facility which is capable of achieving the following:
(1) removing foreign matter present on the power-supplying coil, and
(2) reducing an increase in manufacturing costs due to the movable unit.

Solution to Problem

To achieve the above-mentioned object, a first aspect of the present invention is a parking facility that horizontally moves a pallet on which a vehicle is mounted, to thereby store the vehicle in a storage space, including: the pallet having magnetic field transmissibility in a portion corresponding with a power-receiving coil provided on a bottom surface of the vehicle; a power-supplying coil that is provided in the storage space so as to be opposed to the portion with the magnetic field transmissibility and that supplies power wirelessly to the power-receiving coil; and a foreign matter removal section that is provided on a lower surface of the pallet and that, with a movement of the pallet, engages, by contacting an upper surface of the power-supplying coil or by being spaced a given distance from the upper surface of the power-supplying coil, foreign matter present on the upper surface of the power-supplying coil, to thereby remove the foreign matter from the upper surface of the power-supplying coil.

A second aspect of the present invention is the above-mentioned first aspect, including a foreign matter receiving section that is provided around the power-supplying coil and is lower than the upper surface of the power-supplying coil.

A third aspect of the present invention is the above-mentioned second aspect, including a foreign matter adjacency prevention section with magnetic field transmissibility that is provided between the foreign matter receiving section and the power-supplying coil so as to be in tight contact with a side surface of the power-supplying coil and so as to be at a level equal to that of the upper surface of the power-supplying coil.

A fourth aspect of the present invention is any one of the above-mentioned first to third aspects, including a foreign matter intrusion prevention wall that is provided around the power-supplying coil so as to be at a position opposed to the foreign matter removal section and so as to be high enough to contact a lower end of the foreign matter removal section.

A fifth aspect of the present invention is any one of the above-mentioned first to fourth aspects, including a second foreign matter intrusion prevention wall that is provided on an upper surface of the pallet and is lower than the bottom surface of the vehicle.

Effects of the Invention

According to the present invention, it is possible to remove foreign matter present on the upper surface of the power-supplying coil by the foreign matter removal section that, with the movement of the pallet, engages, by contacting the upper surface or the power-supplying coil or by being spaced a given distance from the upper surface of the power-supplying coil, the foreign matter, to thereby remove the foreign matter on the upper surface of the power-supplying coil. Furthermore, in the present invention, the already-existing pallets are utilized to remove foreign matter. This eliminates the necessity of mounting new movable units. Therefore, it is possible to reduce an increase in manufacturing costs.

BRIEF DESCRIPTION OF THE DRAWINGS

FIG. 7 is a diagram showing a first variant example of the present invention.

DESCRIPTION OF EMBODIMENTS

Hereunder is a description of embodiments of the present invention with reference to the drawings.

First Embodiment

Figure 1A:
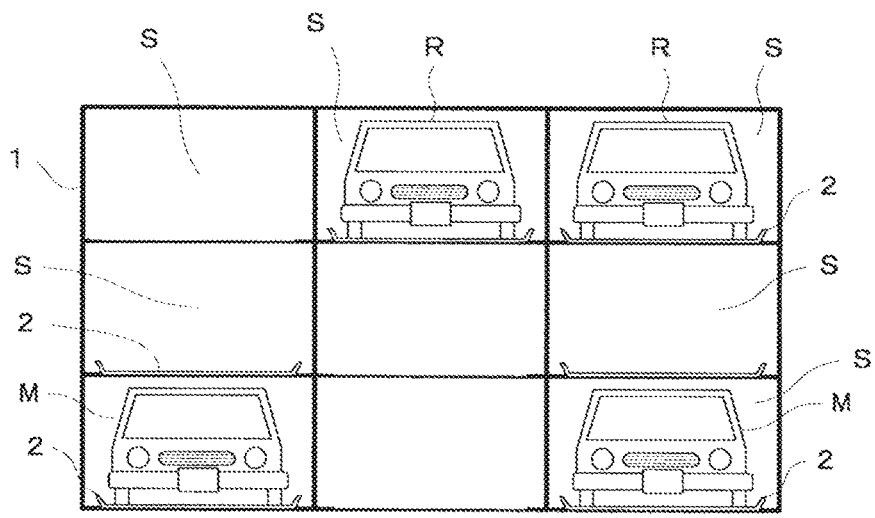
FIG. 1A is a conceptual diagram showing a general structure of a mechanical-parking place (parking facility) according to a first embodiment of the present invention.
Figure 1B:
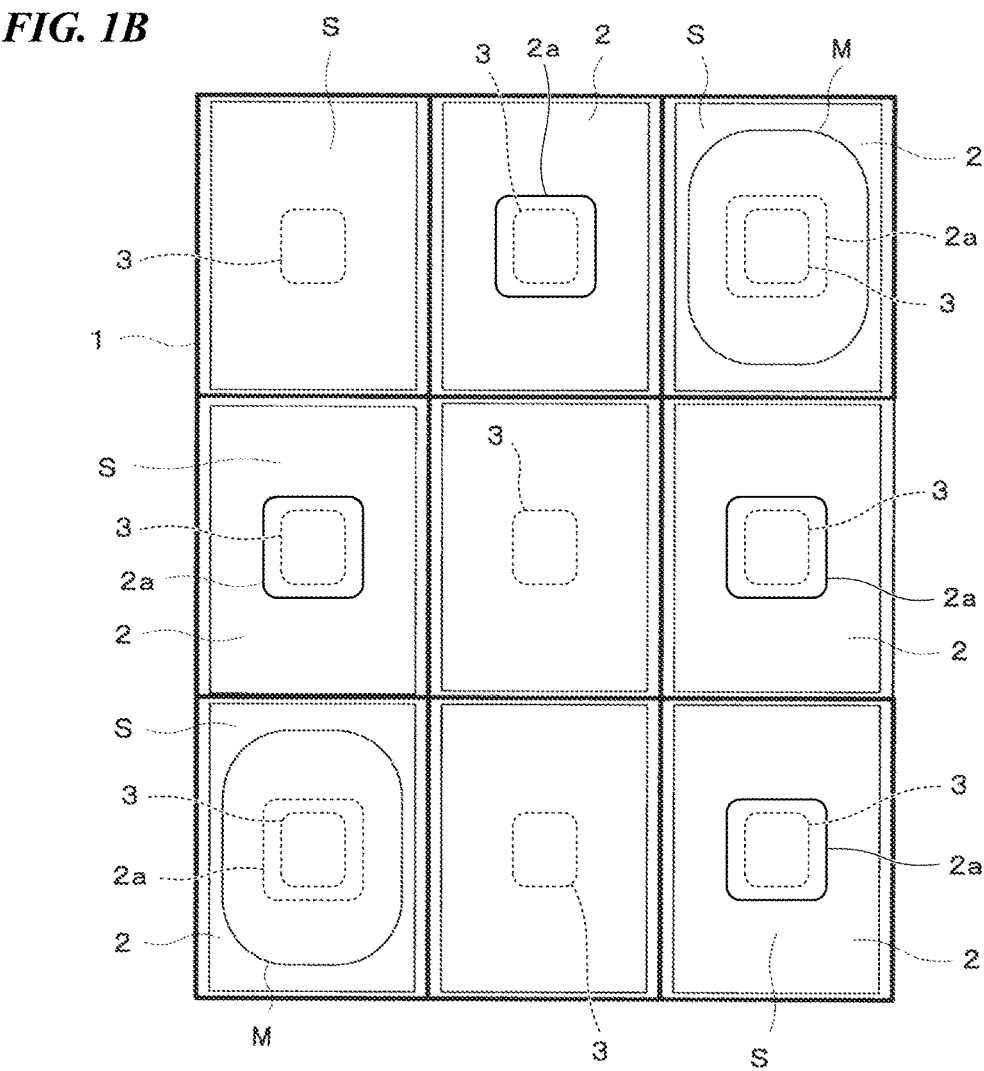
FIG. 1B is another conceptual diagram showing the general structure of the mechanical-parking place (parking facility) according to the first embodiment of the present invention.
Figure 2:
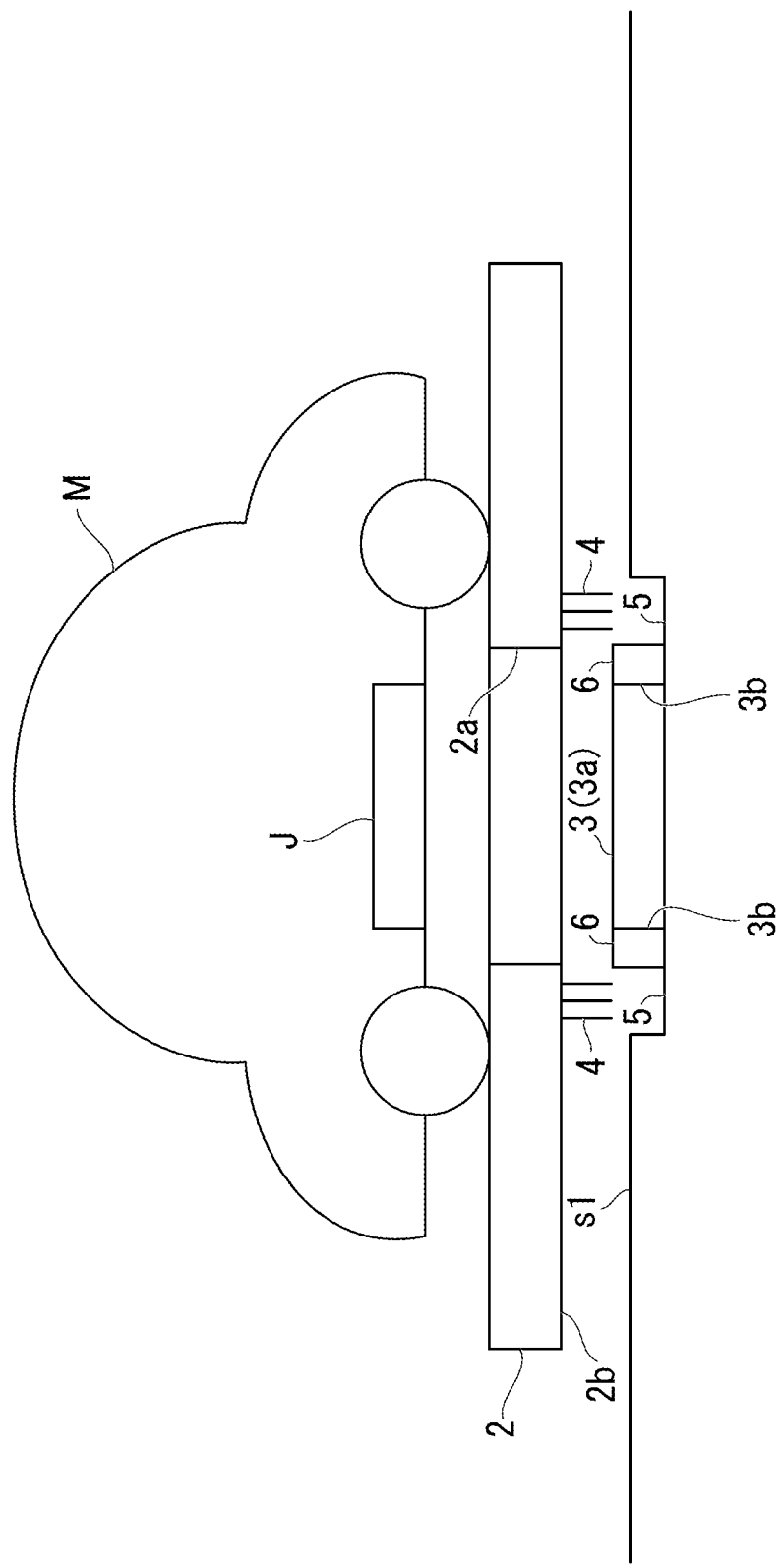
FIG. 2 is a rough diagram showing a structure of the main part of the first embodiment of the present invention.

A first embodiment will be described. As shown in FIG. 1A, FIG. 1B, and FIG. 2, a mechanical-parking place (parking facility) according to the first embodiment comprises a vehicle storage rack 1; pallets 2; power-supplying coils 3; foreign matter removal sections 4; foreign matter receiving sections 5; and foreign matter adjacency prevention sections 6.

As shown in FIGS. 1A and 1B, the vehicle storage rack 1 is provided with a plurality of (27 in total) storage spaces S, three in each of the front-rear, left-right, and up-down directions. The vehicle storage rack 1 shown in these figures limits the number of storage space S for convenience of explanation. However, the vehicle storage rack 1 may be provided with more number of or less number of storage spaces S. In FIGS. 1A, 1B, the storage spaces S are rectangular areas that are arranged in threes in each of the front-rear, left-right, and up-down directions. Pallets 2 are stored in some of the storage spaces.

The pallet 2 is a rectangular plate member made of metal for mounting a vehicle M, and is formed so as to have a size slightly smaller than that of the storage space S. Based on the driving power from a drive mechanism (not shown in the figures) controlled by a control device (not shown in the figures), the pallet 2 moves in front-rear and left-right horizontal directions and in vertical direction. In a central or nearly central portion of the pallet 2, an opening 2a is formed. As for the position and size of the opening 2a, the position corresponds with that of a power-supplying coil 3 opposed to the opening 2a, and the size is slightly larger than that of the power-supplying coil 3, as shown in FIG. 2.

The opening 2a is provided in the pallet 2 in the intention of not obstructing a magnetic field emitted from the power-supplying coil 3. Namely, the portion of the pallet 2 that corresponds with the power-supplying coil 3 has magnetic field transmissibility. The opening 2a may be filled with a material with magnetic field transmissibility such as a resin that does not obstruct the magnetic field, with a view to reinforcing the mechanical strength of the pallet 2.

The power-supplying coil 3 is a helical coil with a predetermined coil diameter. The power-supplying coil 3 is in an exposed state or in a molded state by a non-magnetic material such as a plastic, and is installed in a posture with a coil axis being in an up-down direction (vertical direction) on a floor surface s1 of the storage space S so as to be opposed to the opening 2a of the pallet 2. The power-supplying coil 3 has both of its ends connected to output terminals of a power-supplying circuit (not shown in the figures). With high frequency power being supplied from the power-supplying circuit, the power-supplying coil 3 generates a magnetic field, to thereby supply power wirelessly to the vehicle M. The power-supplying circuit is a type of inverter that is provided with a resonant capacitor for forming a power-supplying-side resonance circuit together with the power-supplying coil 3, and that converts input DC power to AC power (high frequency power) and supplies the AC power to the power-supplying coil 3.

Here, as is shown in the figure, the vehicle M is mounted on the pallet 2. The vehicle M as a power supply target of the present mechanical-parking place is a hybrid vehicle driven by an engine and a motor, or an electric vehicle driven by a motor, namely, a vehicle that charges a rechargeable battery with power wirelessly received by the power-receiving coil J from the power-supplying coil 3 and that utilizes the power charged in the rechargeable battery as a power source of a motor for traveling. A conventional vehicle R driven only by an engine without being provided with the power-receiving coil J, the power-receiving circuit, the rechargeable battery, and the like is not the target of the present mechanical-parking place.

The power-receiving coil J is a helical coil with a predetermined coil diameter, and is provided in a bottom section of the vehicle M so that its coil axis is in the vertical direction. The power-receiving coil J has a coil diameter substantially the same as that of the power-supplying coil 3. The power-receiving coil J has both of its ends connected to input terminals of a power-receiving circuit (not shown in the figures). When coupled electromagnetically with the power-supplying coil 3, the power-receiving coil J wirelessly receives AC power. The above-mentioned power-receiving circuit is a type of rectifier circuit that is provided with a resonant capacitor for forming a power-receiving-side resonance circuit together with the power-receiving coil J and that converts AC power supplied from the power-receiving coil J to DC power and supplies the DC power to the rechargeable battery. Note that capacitance of the resonant capacitor of the power-receiving circuit is set so that the resonance frequency of the power-supplying-side resonance circuit and the resonance frequency of the power-receiving-side resonance circuit be the same.

Figure 3:
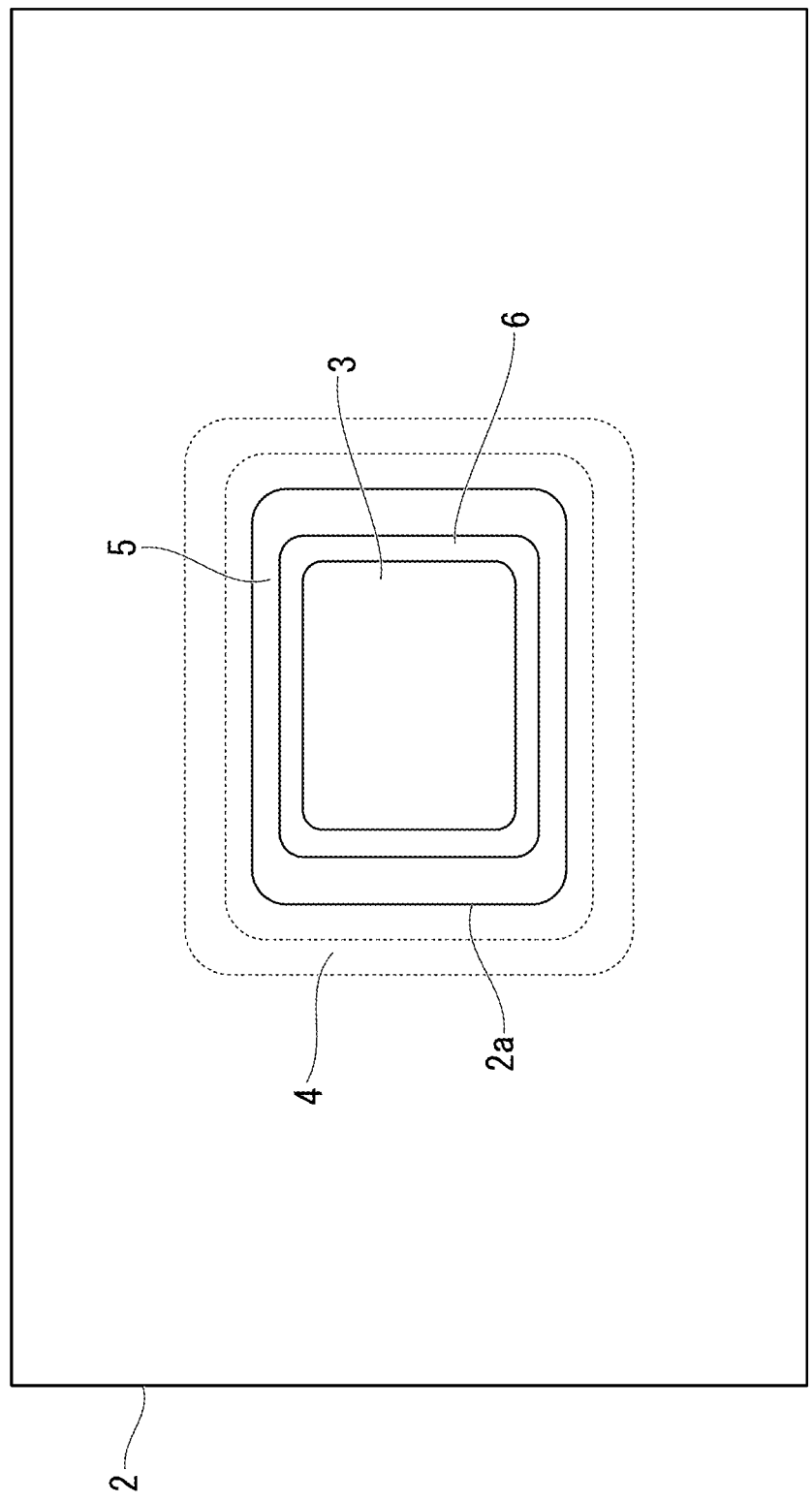
FIG. 3 is a top view showing a pallet, a power-supplying coil, a foreign matter removal section, a foreign matter receiving section, and a foreign matter adjacency prevention section of the first embodiment of the present invention.

The foreign matter removal section 4 is a brush that is made of a plurality of hair-like members formed of a flexible member (plastic, rubber, or the like) and that is adjusted to be long enough to contact with an upper surface 3a of the power-supplying coil 3. The foreign matter removal section 4 is provided on a lower surface 2b of the pallet 2 so as to surround the opening 2a (see FIG. 3). With the horizontal movement of the pallet 2 in the front-rear and left-right directions, the foreign matter removal section 4 horizontally moves along the upper surface 3a of the power-supplying coil 3. As a result, the foreign matter removal section 4 slides along the upper surface 3a of the power-supplying coil 3, to thereby be capable of removing foreign matter such as litter present on the upper surface 3a of the power-supplying coil 3. In FIG. 3, the positional relationship of the opening 2a and the foreign matter removal section 4 with the power-supplying coil 3, the foreign matter adjacency prevention section 6, and the foreign matter receiving section 5 is simplified for convenience of viewability. In actuality, the positional relationship is as shown in FIG. 2.

As shown in FIG. 3, the foreign matter receiving section 5 is provided lower than the upper surface 3a of the power-supplying coil 3 on the floor surface s1 of the storage space S and around the power-supplying coil 3. When the foreign matter removal section 4 slides on the upper surface 3a of the power-supplying coil 3, the foreign matter receiving section 5 receives the foreign matter removed from the surface of the power-supplying coil 3.

The foreign matter adjacency prevention section 6 is made of a material through which a magnetic field is able to propagate without loss (plastic, rubber, or the like). The foreign matter adjacency prevention section 6 is provided between the foreign matter receiving section 5 and the power-supplying coil 3 so as to have a given thickness and be in tight contact with a side surface 3b of the power-supplying coil 3 and so as to be at the same height as the upper surface 3a of the power-supplying coil 3. The foreign matter adjacency prevention section 6 prevents the foreign matter, which has been removed from the upper surface 3a of the power-supplying coil 3 by the foreign matter removal section 4, from falling down immediately beside the power-supplying coil 3 and influencing the electromagnetic field. Namely, the foreign matter adjacency prevention section 6 prevents the foreign matter removed from the upper surface 3a of the power-supplying coil 3 from being adjacent to the side surface 3b of the power-supplying coil 3.

Subsequently, workings and effects of the mechanical-parking place with the structure explained above will be described in detail with reference to FIG. 4A, FIG. 4B, FIG. 4C, and FIG. 4D.

When the vehicle M is to be parked in the present mechanical-parking place, the vehicle M is placed, for example by driving of a driver, on a pallet 2 in a storage space S that is specified in advance as a storage entrance (for example, the storage space S located at the lowermost left position in FIG. 1B). An operator operates on a storage instruction button of an operating device (not shown in the figures) of the mechanical-parking place, to thereby input a storage instruction to the control device. If, in this storage process, the operator receives a request to charge the rechargeable battery of the vehicle M, the operator operates on a charge instruction button in addition to the storage instruction button, to thereby input a charge instruction to the control device.

When the storage instruction and the charge instruction are input from the operating device, the control device of the mechanical-parking place moves the vehicle M in the storage entrance together with the pallet 2 to an unoccupied storage space S. With a horizontal movement of the pallet 2 in the front-rear and left-right directions, the foreign matter removal section 4 moves horizontally while sliding on the upper surface 3a of the power-supplying coil 3.

Figure 4A:
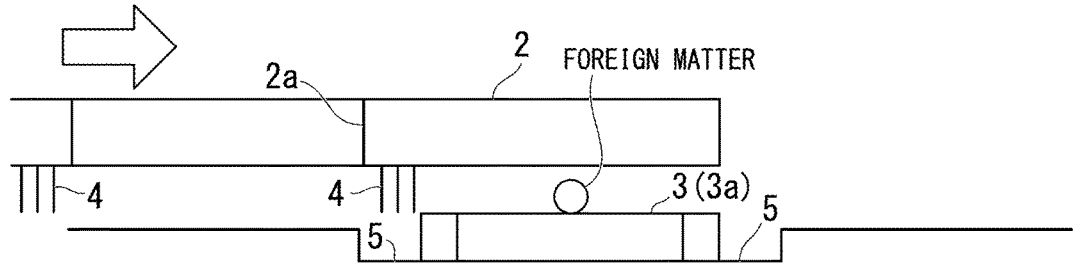
FIG. 4A is a schematic diagram showing the workings and effects of the first embodiment of the present invention.
Figure 4B:
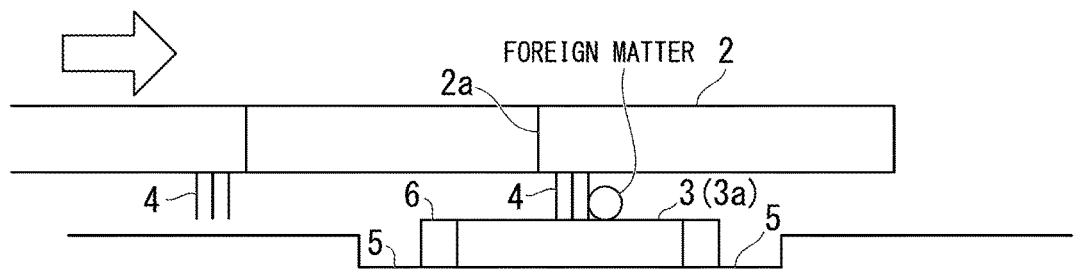
FIG. 4B is a schematic diagram showing the workings and effects of the first embodiment of the present invention.
Figure 4C:
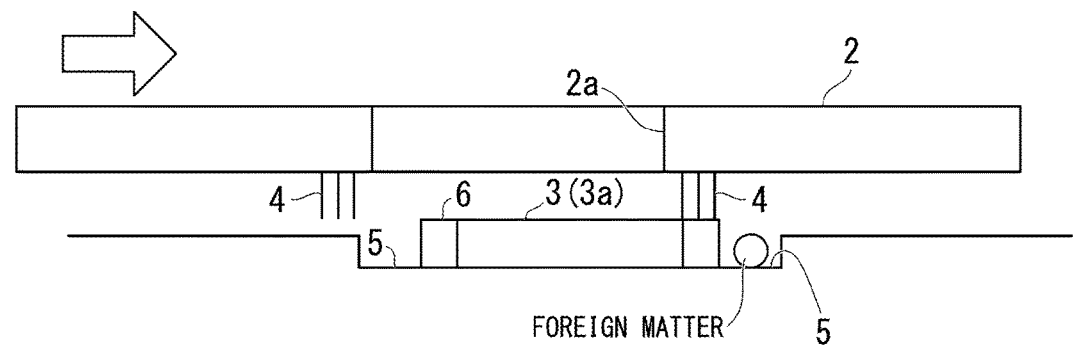
FIG. 4C is a schematic diagram showing the workings and effects of the first embodiment of the present invention.
Figure 4D:
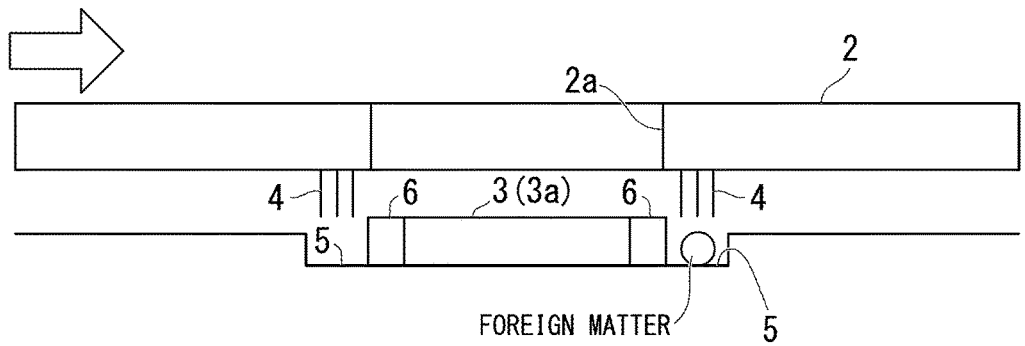
FIG. 4D is a schematic diagram showing the workings and effects of the first embodiment of the present invention.

For example, suppose that before the upper surface 3a of the power-supplying coil 3 is slid by the foreign matter removal section 4, foreign matter is present on the upper surface 3a of the power-supplying coil 3, as shown in FIG. 4A. When the sliding movement of the foreign matter removal section 4 on the upper surface 3a of the power-supplying coil 3 is started, the foreign matter removal section 4 moves the foreign matter on the upper surface 3a of the power-supplying coil 3 toward the foreign matter receiving section 5, as shown in FIG. 4B. With the sliding movement of the foreign matter removal section 4, the foreign matter on the upper surface 3a of the power-supplying coil 3 falls down into the foreign matter receiving section 5, as shown in FIG. 4C. After that, the pallet 2 stops at a position where the opening 2a is opposed to the power-supplying coil 3, as shown in FIG. 4D. Thus, the foreign matter removal section 4 slides along the upper surface 3a of the power-supplying coil 3, to thereby be capable of removing the foreign matter present on the upper surface 3a of the power-supplying coil 3.

After completion of the movement of the vehicle M to the storage space S, the control device of the mechanical-parking place causes the power-supplying circuit to start to supply AC power to the power-supplying coil 3. On the other hand, the vehicle M controls the power-receiving circuit while monitoring the state of charge of the rechargeable battery, to thereby properly charge the rechargeable battery. When the rechargeable battery is in the fully-charged state as a result of this charging operation, the vehicle M outputs a charge completion signal for notifying this fact by means of a communication unit (not shown in the figures). On the other hand, on receiving the charge completion signal, the control device of the mechanical-parking place causes the power-supplying circuit to stop the power supply to the power-supplying coil 3.

According to the first embodiment, it is possible to remove foreign matter present on the upper surface of the power-supplying coil 3 by the foreign matter removal section 4 that, with the movement of the pallet 2, is brought into contact with the upper surface 3a of the power-supplying coil 3 to engage (for example, to push) the foreign matter on the upper surface 3a of the power-supplying coil 3, to thereby remove the foreign matter from the upper surface 3a of the power-supplying coil 3. Furthermore, in the first embodiment, the already-existing pallets 2 are utilized to remove foreign matter. This eliminates the necessity of mounting new movable units. Therefore, it is possible to reduce an increase in manufacturing costs.

Second Embodiment

A mechanical-parking place according to a second embodiment will be described.

Figure 5:
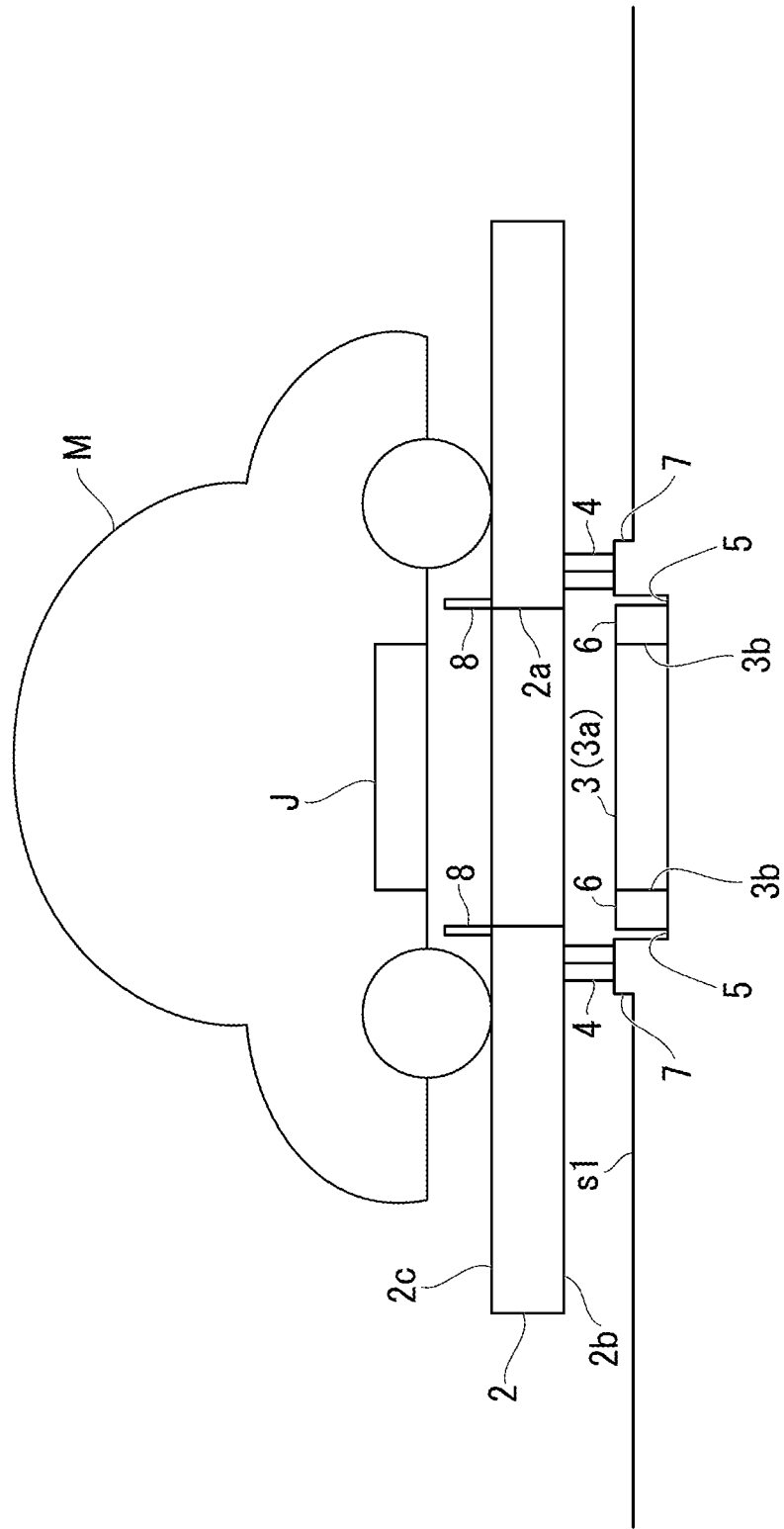
FIG. 5 is a rough diagram showing a structure of the main part of a second embodiment of the present invention.
Figure 6:
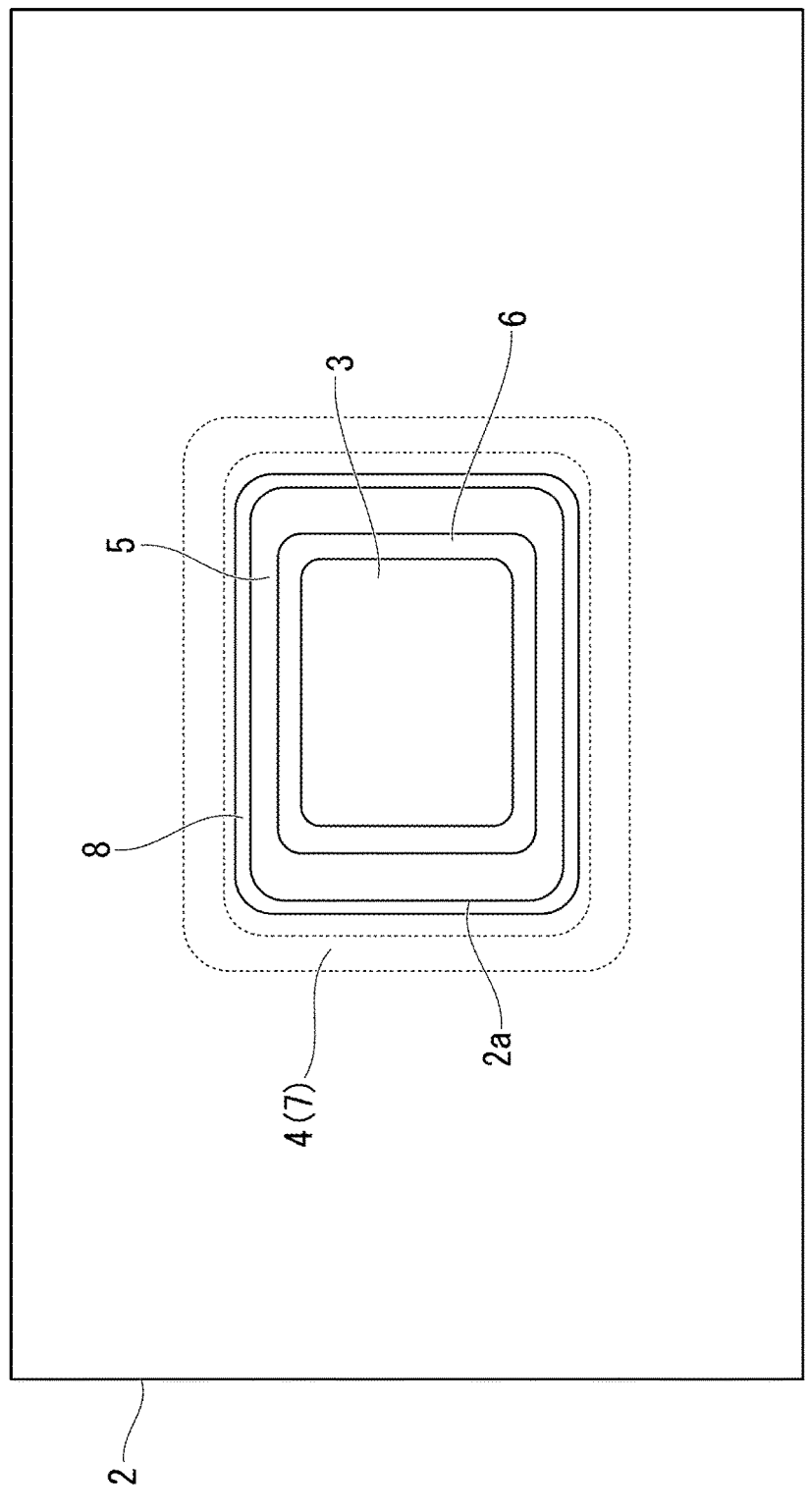
FIG. 6 is a top view showing a pallet, a power-supplying coil, a foreign matter removal section, a foreign matter receiving section, a foreign matter adjacency prevention section, a first foreign matter intrusion prevention wall, and a second foreign matter intrusion prevention wall of the second embodiment of the present invention.

As shown in FIG. 5 and FIG. 6, the mechanical-parking place according to the second embodiment is provided with a first foreign matter intrusion prevention wall 7 and a second foreign matter intrusion prevention wall 8 in addition to the first embodiment. The constituent elements other than these are the same as those of the first embodiment. Therefore, explanations of constituent elements of the second embodiment same as those of the first embodiment are omitted. In FIG. 6, a positional relationship of the opening 2a, the second foreign matter intrusion prevention wall 8, and the foreign matter removal section 4 with the power-supplying coil 3, the foreign matter adjacency prevention section 6, the foreign matter receiving section 5, and the first foreign matter intrusion prevention wall 7 is simplified for convenience of viewability. In actuality, the positional relationship is as shown in FIG. 5.

The first foreign matter intrusion prevention wall 7 is provided on the floor surface s1 of the storage space S so as to surround the power-supplying coil 3 and so as to be high enough to contact a lower end of the foreign matter removal section 4. By surrounding the power-supplying coil 3 together with the foreign matter removal section 4, the first foreign matter intrusion prevention wall 7 prevents foreign matter from intruding into a space between the power-supplying coil 3 and the power-receiving coil J from below the pallet 2.

The second foreign matter intrusion prevention wall 8 is provided on an upper surface 2c of the pallet 2 so as to surround the opening 2a of the pallet 2 and so as to be lower than a bottom surface of the vehicle. By surrounding the opening 2a on the upper surface 2c of the pallet 2, the second foreign matter intrusion prevention wall 8 prevents foreign matter from intruding into the space between power-supplying coil 3 and the power-receiving coil J through a gap between the bottom section of the vehicle M and the pallet 2.

Subsequently, the workings and effects of the second embodiment with the structure explained above will be described in detail. Note that an explanation of the workings same as those of the first embodiment will not be repeated.

In the mechanical-parking place, with the horizontal movement of the pallet 2 in the front-rear and left-right directions, the foreign matter removal section 4 horizontally moves on the upper surface 3a of the power-supplying coil 3 in a sliding manner. As a result, the foreign matter removal section 4 slides along the upper surface 3a of the power-supplying coil 3, to thereby be capable of removing foreign matter present on the upper surface 3a of the power-supplying coil 3.

After completion of the movement of the vehicle M to the storage space S, the control device of the mechanical-parking place causes the power-supplying circuit to start to supply AC power to the power-supplying coil 3. On the other hand, the vehicle M controls the power-receiving circuit while monitoring the state of charge of the rechargeable battery, to thereby properly charge the rechargeable battery. Here, the first foreign matter intrusion prevention wall 7 is in contact with the lower end of the foreign matter removal section 4 and surrounds the power-supplying coil 3 together with the foreign matter removal section 4, to thereby prevent foreign matter from intruding into the space between the power-supplying coil 3 and the power-receiving coil J from below the pallet 2. Furthermore, on the upper surface 2c of the pallet 2, the second foreign matter intrusion prevention wall 8 surrounds the opening 2a, to thereby prevent foreign matter from intruding into the space between the power-supplying coil 3 and the power-receiving coil J through the gap between the bottom section of the vehicle M and the pallet 2.

According to the second embodiment, in addition to the effects of the first embodiment, it is possible to prevent the intrusion of foreign matter by means of the first foreign matter intrusion prevention wall 7 and the second foreign matter intrusion prevention wall 8.

The present invention is not limited to the above-mentioned embodiments, and for example the following variant examples are conceivable:

(1) In the first embodiment, the foreign matter removal section 4 is provided so as to surround the opening 2a. However, the present invention is not limited to this. For example, in the case where the horizontal movement of the pallet 2 is only in the front-rear direction, a foreign matter removal section 14 may be provided on both of the near side and the far side of the opening 2a in the moving direction of the pallet 2, as shown in FIG. 7 (which shows the first embodiment, by way of example). Namely, in accordance with the direction of the horizontal movement of the pallet 2, the foreign matter removal sections 14 may be provided at the minimum required positions that allow the foreign matter removal sections 14 to slide on the upper surface 3a of the power-supplying coil 3.

(2) In the first and second embodiments, the foreign matter removal section 4 is adjusted to be long enough to contact the upper surface 3a of the power-supplying coil 3. However, the foreign matter removal section 4 may be spaced a given distance from the upper surface 3a of the power-supplying coil 3. Namely, being spaced a given distance from the upper surface 3a of the power-supplying coil 3, the foreign matter removal section 4 may engage foreign matter present on the upper surface 3a of the power-supplying coil 3 and remove the foreign matter from the upper surface 3a of the power-supplying coil 3. For example, if minute foreign matter that does not affect the wireless power supply is allowed to remain on the upper surface 3a of the power-supplying coil 3, then the foreign matter removal section 4 may be spaced from the upper surface 3a of the power-supplying coil 3 by L or less where L is a minimum size of the foreign matter to be removed.

(3) For the foreign matter removal section 4, a blade member may be used instead of a brush.

(4) In the above-mentioned embodiments, the power-supplying coil 3 is provided in all the storage spaces S that constitute the vehicle storage rack 1, to thereby make the power supply available in all of the storage spaces S. However, the present invention is not limited to this. The power-supplying coil 3 may be provided in some of the storage spaces S, and the vehicle M which the driver requests to be charged with power may be selectively moved from the storage entrance to the storage space S provided with the power-supplying coil 3.

(5) In the above-mentioned embodiments, the opening 2a is provided in the pallet 2 made of metal in order to enhance the power-supplying efficiency. However, the present invention is not limited to this. For example, the pallet may be formed from a resin material with high rigidity, namely, a material with rigidity and low magnetic permeability. This makes it possible to enhance the power-supplying efficiency without providing an opening.

(6) In the above-mentioned embodiments, a magnetic field resonance system is adopted as a method of carrying out wireless power supply. However, an electromagnetic induction system may be adopted.

(7) The power-supplying coil 3 and the power-receiving coil J are not limited to helical coils. So long as wireless power supply is available between the power-supplying coil 3 and the power-receiving coil J, the coils may have arbitrary type and shape such as a solenoid shape. In addition, the coils may be different in type, shape, and size.

INDUSTRIAL APPLICABILITY

It is possible to remove foreign matter present on the power-supplying coil and also to reduce an increase in manufacturing costs due to the movable unit.

DESCRIPTION OF REFERENCE SIGNS

1: vehicle storage rack
2: pallet
3: power-supplying coil
4, 14: foreign matter removal section
5: foreign matter receiving section
6: foreign matter adjacency prevention section
2a: opening
2b: lower surface
2c: upper surface 3a: upper surface
3b: side surface
M: vehicle
J: power-receiving coil
s1: floor surface

The invention claimed is:

1. A parking facility that horizontally moves a pallet on which a vehicle is mounted, to thereby store the vehicle in a storage space, comprising:
    the pallet having magnetic field transmissibility in a portion corresponding with a power-receiving coil provided on a bottom surface of the vehicle;
    a power-supplying coil that is provided in the storage space so as to be opposed to the portion with the magnetic field transmissibility and that supplies power wirelessly to the power-receiving coil; and
    a foreign matter removal section that is provided on a lower surface of the pallet and that, with a movement of the pallet, engages, by contacting an upper surface of the power-supplying coil or by being spaced a given distance from the upper surface of the power-supplying coil, foreign matter present on the upper surface of the power-supplying coil, to thereby remove the foreign matter from the upper surface of the power-supplying coil.

2. The parking facility according to claim 1, comprising a foreign matter receiving section that is provided around the power-supplying coil and is lower than the upper surface of the power-supplying coil.

3. The parking facility according to claim 2, comprising a foreign matter adjacency prevention section with magnetic field transmissibility that is provided between the foreign matter receiving section and the power-supplying coil so as to be in tight contact with a side surface of the power-supplying coil and so as to be at a level equal to that of the upper surface of the power-supplying coil.

4. The parking facility according to claim 1, comprising a foreign matter intrusion prevention wall that is provided around the power-supplying coil so as to be at a position opposed to the foreign matter removal section and so as to be high enough to contact a lower end of the foreign matter removal section.

5. The parking facility according to claim 1, comprising a second foreign matter intrusion prevention wall that is provided on an upper surface of the pallet and is lower than the bottom surface of the vehicle.

6. The parking facility according to claim 2, comprising a foreign matter intrusion prevention wall that is provided around the power-supplying coil so as to be at a position opposed to the foreign matter removal section and so as to be high enough to contact a lower end of the foreign matter removal section.

7. The parking facility according to claim 3, comprising a foreign matter intrusion prevention wall that is provided around the power-supplying coil so as to be at a position opposed to the foreign matter removal section and so as to be high enough to contact a lower end of the foreign matter removal section.

8. The parking facility according to claim 2, comprising a second foreign matter intrusion prevention wall that is provided on an upper surface of the pallet and is lower than the bottom surface of the vehicle.

9. The parking facility according to claim 3, comprising a second foreign matter intrusion prevention wall that is provided on an upper surface of the pallet and is lower than the bottom surface of the vehicle.

10. The parking facility according to claim 4, comprising a second foreign matter intrusion prevention wall that is provided on an upper surface of the pallet and is lower than the bottom surface of the vehicle.

* * * * *